United States Patent
Riedel

(10) Patent No.: US 11,427,323 B2
(45) Date of Patent: Aug. 30, 2022

(54) GALLEY MONUMENT WITH INTEGRATED DISPLAY ARRANGEMENT

(71) Applicant: Airbus Operations GmbH, Hamburg (DE)

(72) Inventor: Christian Riedel, Hamburg (DE)

(73) Assignee: Airbus Operations GmbH

( * ) Notice: Subject to any disclaimer, the term of this patent is extended or adjusted under 35 U.S.C. 154(b) by 333 days.

(21) Appl. No.: 16/211,766

(22) Filed: Dec. 6, 2018

(65) Prior Publication Data

US 2019/0210729 A1 Jul. 11, 2019

(30) Foreign Application Priority Data

Jan. 8, 2018 (DE) ..................... 10 2018 200 139.1

(51) Int. Cl.
*B64D 11/00* (2006.01)
*F16B 5/06* (2006.01)
*F16B 5/12* (2006.01)
*B64D 11/04* (2006.01)
*B64G 1/60* (2006.01)
*F16B 5/02* (2006.01)

(52) U.S. Cl.
CPC .......... *B64D 11/0015* (2013.01); *B64D 11/04* (2013.01); *B64G 1/60* (2013.01); *F16B 5/02* (2013.01); *F16B 5/0635* (2013.01); *F16B 5/121* (2013.01)

(58) Field of Classification Search
CPC . B64D 11/0015; B64D 11/0007; B64D 11/04; B64G 1/60; F16B 5/02; A47B 31/00; F16M 11/14
See application file for complete search history.

(56) References Cited

U.S. PATENT DOCUMENTS

| 5,145,128 | A | 9/1992 | Umeda |
| 6,816,364 | B2 * | 11/2004 | Helot .................... F16M 11/105 248/919 |
| 2006/0175499 | A1 * | 8/2006 | Price .................. F16M 11/2078 248/278.1 |
| 2008/0136299 | A1 * | 6/2008 | Peurifoy ................ B64D 11/04 312/237 |

(Continued)

FOREIGN PATENT DOCUMENTS

| DE | 20 2011 101 521 U1 | 2/2012 |
| DE | 10 2017 205 637 A1 | 10/2018 |

(Continued)

OTHER PUBLICATIONS

Search Report for French Application No. FR1873287 dated Mar. 29, 2022. 8 pgs. (see p. 8, categorizing the cited references).

*Primary Examiner* — Joshua J Michener
*Assistant Examiner* — Cindi M Curry
(74) *Attorney, Agent, or Firm* — Lerner, David, Littenberg, Krumholz & Mentlik, LLP

(57) ABSTRACT

A galley monument having an integrated display arrangement includes a display; a display holder, by which the display is movably attached to the galley monument, wherein the display holder is designed as a rotary-pivot joint; and a receiving region, into which the display can be pivoted into a stowed state by the display holder; wherein the display can be rotated by the display holder in a state of use in order to set an orientation for use.

16 Claims, 3 Drawing Sheets

(56) References Cited

U.S. PATENT DOCUMENTS

| | | | | |
|---|---|---|---|---|
| 2009/0146033 A1* | 6/2009 | Chiang | ............... | A47B 21/03 |
| | | | | 248/284.1 |
| 2014/0111705 A1* | 4/2014 | Wade | ............... | G06F 1/1601 |
| | | | | 348/838 |
| 2014/0191103 A1* | 7/2014 | Simon | ............... | F16M 11/105 |
| | | | | 248/558 |
| 2017/0121024 A1* | 5/2017 | Young | ............... | B64D 11/00152 |
| 2019/0120284 A1* | 4/2019 | Koelln | ............... | F16C 11/0619 |
| 2020/0047889 A1* | 2/2020 | Kurz | ............... | B64D 11/0691 |

FOREIGN PATENT DOCUMENTS

| | | |
|---|---|---|
| EP | 2 739 126 A1 | 6/2014 |
| WO | 0150745 A1 | 7/2001 |
| WO | 2005/120053 A1 | 12/2005 |
| WO | 2008/066722 A2 | 6/2008 |

* cited by examiner

GALLEY MONUMENT WITH INTEGRATED DISPLAY ARRANGEMENT

FIELD OF THE INVENTION

The present invention relates to a galley monument with an integrated display arrangement for a vehicle, in particular an aircraft or spacecraft. The present invention furthermore relates to an aircraft or spacecraft with a galley monument of this kind.

Although it can be used in many different applications, aspects of the present invention and the problem underlying the invention are explained in detail with reference to passenger aircraft. However, the devices described can likewise be employed in different vehicles and in all sectors of the transport industry, e.g. for road vehicles, rail vehicles, aircraft or watercraft.

BACKGROUND OF THE INVENTION

Galleys on passenger aircraft typically comprise one or more galley monuments, i.e. individual galley modules, which often have a monolithic basic structure and make available different functions in an integrated way. For example, a galley monument of this kind can contain different galley components for the preparation of meals and/or drinks within a very confined space, e.g. hot water boilers, coffee machines, fan ovens, cooking hobs, sinks, coolboxes, refrigerators etc. In conventional embodiments, galley monuments furthermore have a multiplicity of cubbyholes to hold containers and/or trolleys (galley carts). To secure the containers in position within the respective cubbyhole, one or more mechanical catches operated manually by the crew are used in typical embodiments. For example, the catches are opened to insert a container and closed again to fix a container inserted into a cubbyhole.

The integration of a display (see document EP 2 739 126 A1, for example) into a galley monument of this kind for the control, monitoring and/or operation of the galley is difficult, not least because of the considerably restricted space management involved. Moreover, galleys are often adapted to a high degree for specific customers, making the use of a pre-produced solution more difficult.

BRIEF SUMMARY OF THE INVENTION

Given this background situation, an aspect of the present invention is directed to integrating a display in a flexible manner into a galley monument.

Accordingly, a galley monument with an integrated display arrangement is provided. The galley monument comprises a display; a display holder, by means of which the display is movably attached to the galley monument, wherein the display holder is designed as a rotary-pivot joint; and a receiving region, into which the display can be pivoted into a stowed state by means of the display holder; wherein the display can be rotated by means of the display holder in a state of use in order to set an orientation for use.

An aircraft or spacecraft having a galley is furthermore provided. The galley comprises at least one galley monument according to the invention.

One concept underlying the invention consists in mounting a display on the outside of a galley monument by means of a movable holder. In this case, the attachment is configured with a flexibility such that the display is supported rotatably and pivotably or tiltably. The display can be rotated and/or pivoted or tilted by different angles in different directions, thereby enabling an ideal orientation or position to be set at all times. The display can be rotated around the holder by ±90°, 180° or 270° etc., for example. If, for example, the flight crew want to operate a galley component, e.g. a coffee machine, or to remove a container from a cubbyhole in front of which the display is arranged at that moment, the display can simply be moved by rotation to the left, to the right, up or down in order to free the corresponding galley component. Moreover, it can be pivoted in or folded away, that is to say moved into the stowed state, depending on the flight situation, e.g. during starting and/or landing or when the galley is not required. In general, the display can be rotated or pivoted into an optimum alignment at any time, allowing the display to be operated by the flight crew irrespective of height.

The display holder can hold the display in any position without further mechanical support by static friction, and the display can be of continuously adjustable configuration, that is to say of rotatable and tiltable configuration. In principle, provision is likewise made for the display to latch in discrete predetermined positions or alignments. For example, manual and/or automatic locking can be provided, by means of which the display latches in predetermined positions. In this case, the display holder can be of sufficiently robust configuration and securely held to withstand vibration, shocks or general loads.

For this purpose, the display holder can be secured on a galley, e.g. on outer edges and/or outer sides, on webs, beams or columns or the like or, for example, on holders specially provided for this purpose. Ultimately, the flexible holder principle according to the invention enables the display to be mounted in virtually any position on a galley. A display arrangement according to the invention can be installed or integrated individually into a galley. However, the solution according to the invention advantageously offers the possibility of mounting a display retrospectively at a suitable point on a galley monument, that is to say the solution according to the invention is suitable for retrofitting.

A display in the sense according to an embodiment of the invention is an electronic visual indicator, such as an LED, OLED, TFT or LCD screen or the like, with or without backlighting. At the same time, a display in the sense according to an embodiment of the invention also comprises touchscreens or the like, which, in addition to information output, also allow input via a screen acting as a touch panel.

A rotary-pivot joint or rotary-tilting joint in the sense according to an embodiment of the invention has mutually independent degrees of freedom for rotation and pivoting. In particular, a rotary-pivot joint in the sense according to an embodiment of the invention can provide a degree of freedom for rotation about a fixed axis of rotation and a degree of freedom for pivoting or tilting about a pivoting axis which is aligned perpendicularly to said axis of rotation.

Advantageous embodiments and developments will be found in the additional dependent claims and in the description with reference to the figures.

According to a development, the display holder can be designed in such a way that the display can be pivoted into the receiving region as far as a maximum inward-pivoting angle relative to the galley monument. For example, the maximum inward-pivoting angle can define a stowage position of the display.

The maximum inward-pivoting angle can be 90°, for example. For example, provision can be made for the display to be folded away through 90° into the receiving region in order to remove it as far as possible from the operating area of the galley monument, ensuring that the freedom of movement of the flight crew is restricted as little as possible, depending on the flight situation or operating situation, for example. In alternative embodiments, different maximum inward-pivoting angles can be provided, e.g. 45°, 60°, 120° etc.

According to an embodiment, the display can be pivoted out from the galley monument by means of the display holder in the state of use. Depending on the embodiment, the display can thus not only be moved into a stowage position but, on the contrary, can also be folded out, e.g. in order to set the visibility of the display in an optimum manner, depending on the situation.

According to an embodiment, the display holder can be designed in such a way that the display can be pivoted out as far as a maximum outward-pivoting angle relative to the galley monument. The freedom of movement of the display towards the outside can likewise be restricted by making an appropriate choice of maximum outward-pivoting angle. The maximum outward-pivoting angle can be restricted to 60°, 45°, 30°, 20°, 10° or even approximately 0°, for example. In the latter case, it is thus impossible for the display to be tilted outwards beyond the state of use at 0°.

According to an embodiment, the display holder can be designed in such a way that the display can be rotated by 360° around the display holder in the state of use. The display holder can thus provide a rotary joint in the sense of a turntable or slewing ring or "revolving joint". For example, the display holder can be mounted on an edge or a web of a galley monument, wherein the display can be aligned approximately perpendicularly to the bearing of the display holder in a state of use. For example, the display can be aligned approximately plane-parallel to a vertical outer surface or outer structure of the galley monument in the state of use. The display can likewise be pivoted outwards at an angle away from the vertical outer surface.

According to an embodiment, a display housing can be provided, into which the display holder is integrated. The display housing can be combined and/or connected to the display holder or, via the display holder, to the galley monument, e.g. in a manner similar to the way a screen of a laptop is mounted movably on a laptop casing.

According to an embodiment, the display housing can be formed integrally together with the display holder. For example, the display housing can be printed in an integrated way together with the display holder in an additive manufacturing process.

According to an embodiment, the display holder can be mounted on a horizontal and/or vertical outer edge of the galley monument. For example, the display holder can be mounted on an outer edge of a cubbyhole. It is likewise also possible, for example, for the display holder to be mounted on a web or a column, rod etc. of the galley monument, wherein a free space in the galley monument, e.g. the space above a sideboard or the like, can, as it were, serve as a receiving region.

According to an embodiment, the receiving region can be a cubbyhole and/or a display receptacle. On the one hand, it is thus possible for a cubbyhole to act as a receiving region, which can furthermore be designed to receive a galley component, e.g. to receive a container, a trolley cart or the like. In this case, the display can only be folded away into the cubbyhole when the cubbyhole is completely or at least partially empty, for example. It is furthermore possible for a receptacle to be provided specifically for accommodating the display, and this can therefore be available at any time. In principle, combinations of these arrangements are also conceivable by virtue of the flexible mobility of the display. For example, the display can be secured on a galley monument by means of the display holder in such a way that the display can be pivoted either into one or more cubbyholes or, alternatively, into a special display receptacle.

According to an embodiment, safety brackets can be mounted on the display. For example, narrow safety brackets or webs can be provided on the edge of the display, ensuring that the display cannot accidentally make contact, with an edge or corner of the galley monument for example, during rotation and/or tilting or pivoting.

According to an embodiment, the safety brackets can be designed as gripping brackets for manual movement of the display. Fundamentally, the display can be moved manually by grasping a display housing. In principle, however, safety brackets can likewise advantageously be used to move the display.

According to an embodiment, power lines and/or data lines for supplying the display can extend within the display holder between the galley monument and the display. For example, display cables can be passed through the display holder in a manner similar to the way a display cable passes through the hinge of a laptop.

The above embodiments and developments can be combined in any desired manner, as and when appropriate. Further possible embodiments, developments and implementations of the invention also include combinations, not explicitly mentioned, of features of the invention that are described above or below with reference to the embodiment examples. In this context, a person skilled in the art will, in particular, also add individual aspects as improvements or supplementary features to the respective basic form of the present invention.

BRIEF DESCRIPTION OF THE DRAWINGS

The present invention is explained in greater detail below by means of the embodiment examples indicated in the schematic figures. Here.

DETAILED DESCRIPTION

Figure 1:
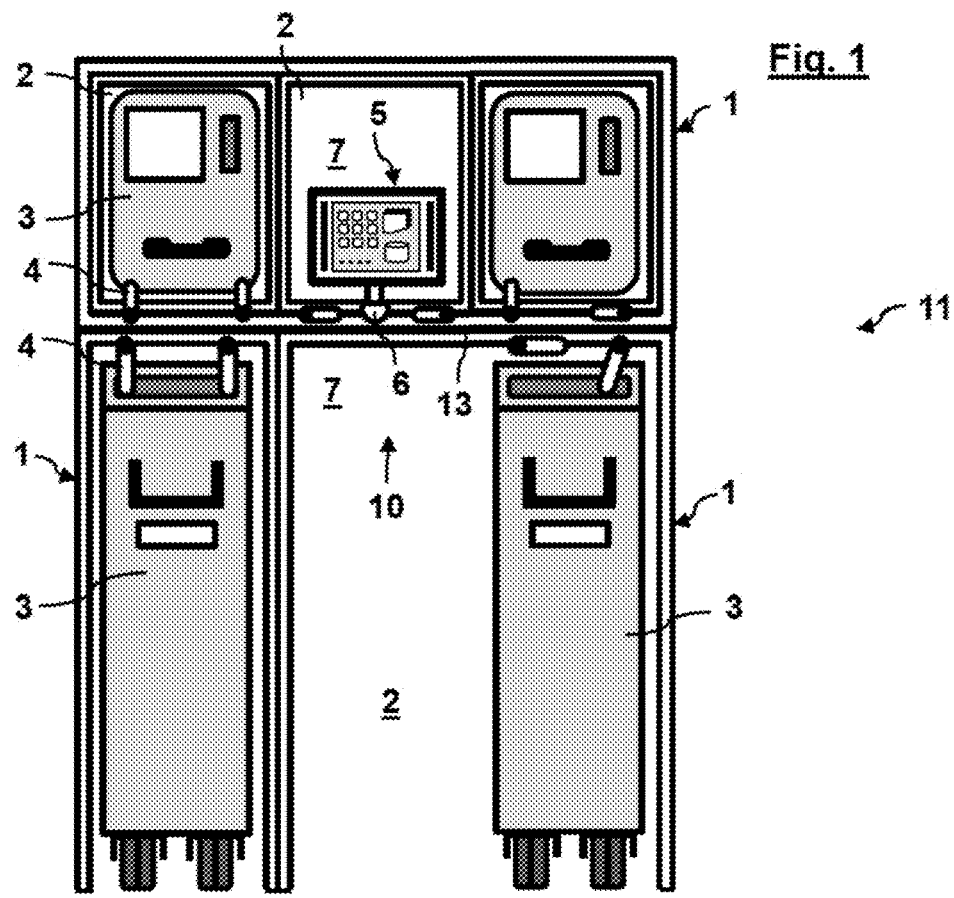
FIG. 1 shows a schematic front side view of a galley with an integrated display arrangement according to one embodiment of the invention.

The attached figures are intended to impart greater understanding of the embodiments of the invention. They illustrate embodiments and, in combination with the description, serve to explain principles and concepts of the invention. Other embodiments and many of the stated advantages will become apparent when viewing the drawings. The elements of the drawings are not necessarily shown to scale relative to one another.

In the figures of the drawing, identical, functionally identical and identically acting elements, features and components are each provided with the same reference signs, unless stated otherwise.

Figure 5:
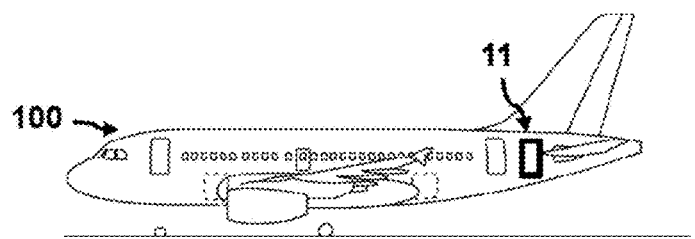
FIG. 5 shows a schematic side view of an aircraft with the galley from FIG. 1.

FIG. 1 shows a schematic front side view of a galley 11 with an integrated display arrangement 10 according to one embodiment of the invention. The galley 11 can be provided, for example, in a passenger cabin of an aircraft 100, in particular a passenger aircraft, of the kind illustrated by way of example in FIG. 5.

In this embodiment, the galley 11 is divided, purely by way of example, into three galley monuments 1. Each of these galley monuments 1 has one or more cubbyholes 2, which are designed to hold one or more galley components 1. Thus, one of the galley monuments 1 (at the bottom right in FIG. 1) has a cubbyhole 2 for holding two galley components 3, in this case two trolleys. A cubbyhole 2 for just a single trolley is formed to the left thereof (at the bottom left in FIG. 1) in the galley monument. Arranged above these two galley monuments 1 is a third galley monument 1, which can hold three containers, e.g. meal containers, as galley components 3, one in each cubbyhole 2. The cubbyholes 2 can have standardized dimensions for holding standardized containers or the like, for example.

Purely by way of example, two catches 4 are mounted on each of the cubbyholes 2 on the respective galley monument 1. Each of these catches 4 is designed to be movable between a closed position and an open position. In the closed position, a galley component 3 situated in the cubbyhole 2 is locked fast or held fast in the cubbyhole 2 by the catch 4. In the open position, the catch releases the cubbyhole 2 for the reception and removal of a galley component 3. At the bottom left in FIG. 1, for example, a trolley is held in the galley monument 1 by two catches 4 (at the top on the galley component 3).

The upper galley monument 1 comprises an integrated display arrangement 10 having a display 5 and a display holder 6, by means of which the display 5 is movably attached to the galley monument 1. For this purpose, the display holder 6 is designed as a rotary-pivot joint or rotary-tilting joint, thus enabling the display 5 to be pivoted by means of the display holder 6 into a receiving region 7 in order to transfer it to a stowed state, and to be rotated by means of the display holder 6 to set an orientation for use in a state of use.

Figure 2:
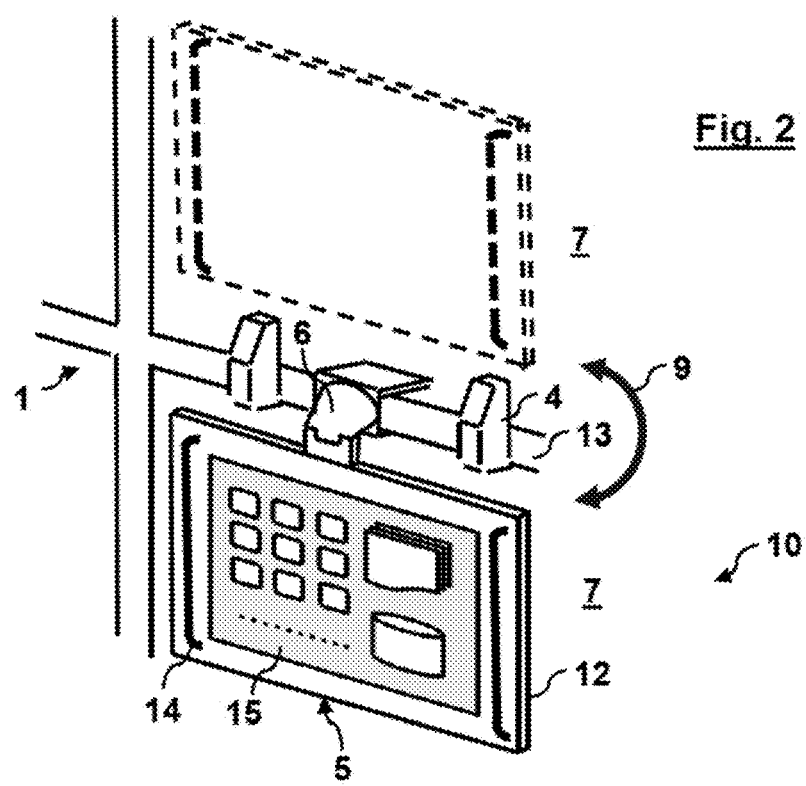
FIG. 2 shows a schematic perspective view of the display arrangement from FIG. 1.

The specific manner of operation of this display arrangement is explained below with reference to FIGS. 2-4. For this purpose, FIG. 2 shows a schematic perspective view of the display arrangement 10 from FIG. 1, FIG. 3 shows a schematic front view of the display arrangement 10, and FIG. 4 shows a schematic sectioned side view of the display arrangement 10.

The display holder 6 is mounted centrally between the two catches 4 of a cubbyhole 2 on a horizontal outer edge 13 of the galley monument 1. Here, the cubbyhole or cubbyholes 2 serve as a receiving region 7. In principle, however, it is likewise possible for a display receptacle that is specifically provided to hold the display 5 to be formed on the galley monument 1. In FIG. 2, the display 5 is in the state of use and can be rotated in an infinitely variable manner by an angle of rotation 9 about an axis of rotation 17 (cf. FIG. 3, with the catches 4 in this illustration being movable about the axes of rotation 17' between the open and the closed position) (see arrow in FIG. 2). The display 5 can thus be rotated upwards by 180° from the lower orientation for use depicted in FIG. 2 (cf. dashed lines in FIG. 2). The outside dimensions of the display holder 6 and of the display 5 are chosen in such a way that the display 5 or the display holder 6 do not collide with the catches 4 during this process and the latter continue to remain usable. The depicted angle of rotation of 180° should be taken as purely illustrative here. In principle, the display 5 can be rotated by any angle between 0° and 360°.

The display 5 has a display housing 12 with an indicator unit 15, which is framed by two parallel safety brackets 14. In this illustrative embodiment, the display holder 6 is manufactured integrally with the display housing 12. The safety brackets 14 serve, on the one hand, to protect the indicator unit 15 of the display 5. On the other hand, the safety brackets 14 are designed as gripping brackets for manual movement of the display 5. Fundamentally, it is, of course, likewise possible to grasp and move the display 5 by means of the display housing 12. The indicator unit 15 can be an OLED or LCD screen or the like, and the indicator unit 15 can be designed to be touch-sensitive as a touch screen or touch display. For example, the display 5 can be designed for the operation or control of the galley 11 or of the galley monument 1, for displaying information and/or galley data etc. For example, the display 5 can be connected (not depicted) for communication with a control unit of the galley monument 1 and for inputting and outputting control commands, which are executed by the control unit. For example, each galley monument 1 can have a local control unit, which is managed by a central controller of the galley 11. The central controller can be connected to a controller area network (CAN) of a cabin management system or the like. Power lines and/or data lines for supplying the display 5 that are required for this purpose can extend within the display holder 6 between the galley monument 1 and the display 5, as in the case of a laptop hinge.

Figure 3:
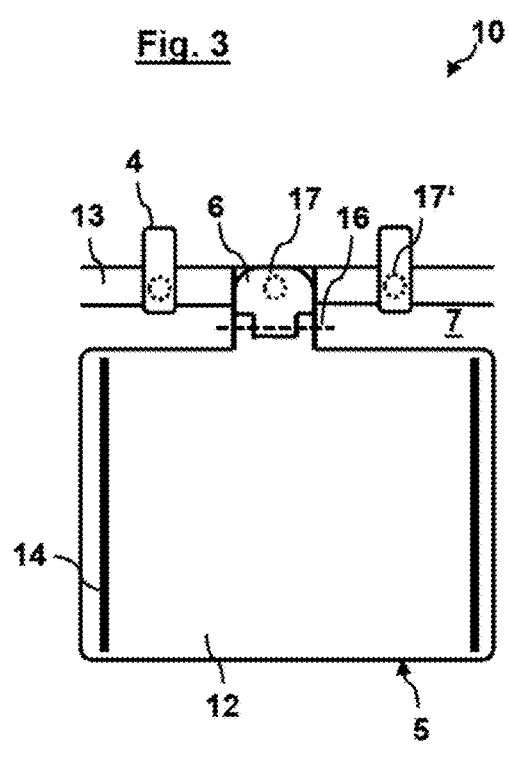
FIG. 3 shows a schematic front view of the display arrangement from FIG. 1.
Figure 4:
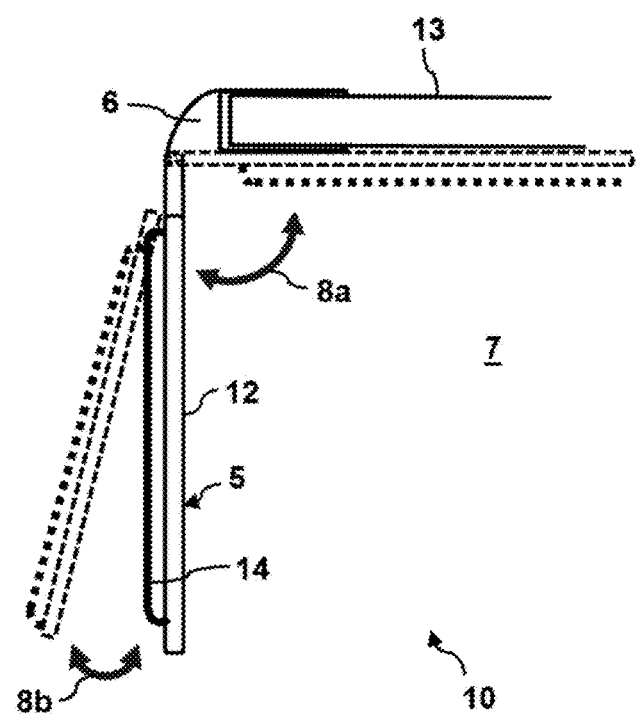
FIG. 4 shows a sectioned side view of the display arrangement from FIG. 1.

As FIG. 4 shows, the display 5 can be pivoted into the receiving region 7 by an inward-pivoting angle 8a, wherein the display 5 is moved about a pivoting axis or tilting axis 16 (cf. FIG. 3). In this illustrative embodiment, the display holder 6 is designed in such a way that the display 5 can be pivoted into the receiving region 7 as far as a maximum inward-pivoting angle 8a of 90° relative to the galley monument 1. Fundamentally, however, the display holder 6 is designed for infinitely variable pivoting of the display between 0° and 90°, wherein the display holder 6 holds the display 5 in each position without further mechanical support by means of static friction. In principle, however, provision can be made for the display 5 to latch in discrete predetermined positions or alignments (e.g. in the stowage position at 90°). In this case, the display holder 6 is of sufficiently robust configuration to withstand vibration, shocks or general loads. As can be seen from FIG. 1, the display 5 can not only be folded into the cubbyhole 2 of the upper galley monument 1. In addition, the display 5 can likewise be folded into the cubbyhole 2 of the galley monument 1 at the bottom right (after a rotation by 180°). Of course, the display 5 can only be folded into corresponding cubbyholes 2 when these are not currently occupied by a galley component 3.

In addition, however, the display 5 cannot only be folded away into the receiving region 7 but can furthermore be pivoted out from the galley monument 1 by means of the display holder 6 in the state of use (cf. FIG. 4). For this purpose, the display holder 6 is designed in such a way that the display 5 can be pivoted out relative to the galley monument 1 by an outward-pivoting angle 8b. For example, a maximum outward-pivoting angle 8b of 20° can be provided. However, infinitely variable adjustment of the display 5 by an outward-pivoting angle of between 0° and 90° or more can likewise be provided.

Figure 6:
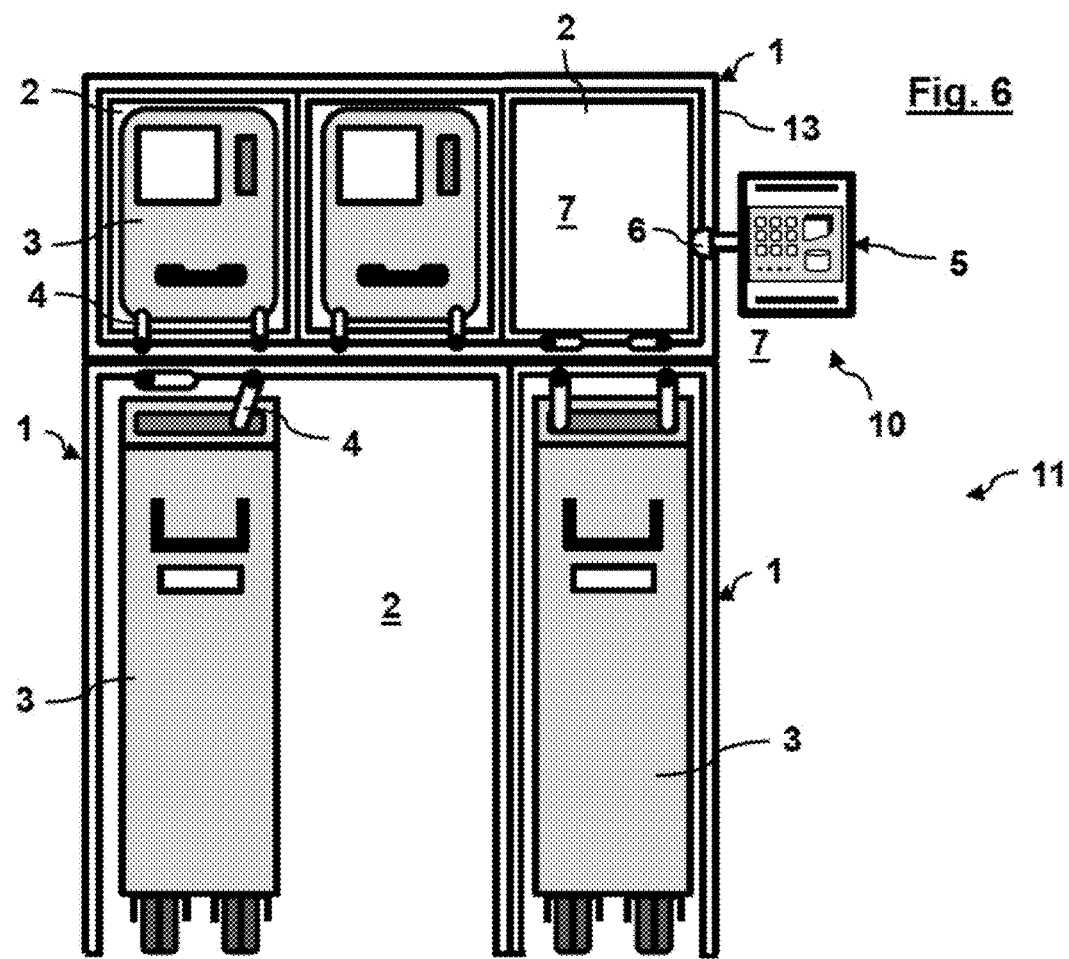
FIG. 6 shows a schematic front side view of a galley with an integrated display arrangement according to another embodiment of the invention.
Figure 7:
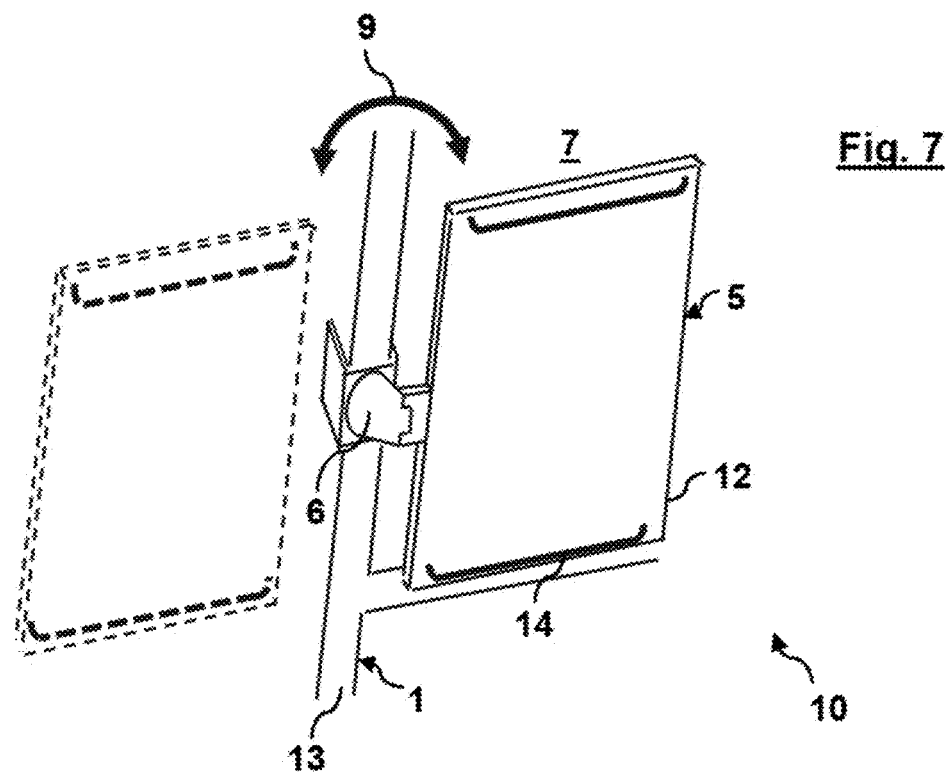
FIG. 7 shows a schematic perspective view of the display arrangement from FIG. 6.

By virtue of a combination of degrees of freedom for rotation and pivoting, the display arrangement 10 shown offers high flexibility and can be mounted in a very wide variety of arrangements and configurations on a galley monument 1 or galley 11. Here, the version shown in FIG. 1 is purely illustrative. Another example is shown in FIGS. 6 and 7. Unlike in the embodiment in FIG. 1, the display holder 6 in this case is mounted on a vertical outer edge 13 of the upper galley monument 1. Corresponding rotation and/or pivoting possibilities are obtained directly from the arrangement of the display holder 6 which is shown in FIG. 7. In this illustrative embodiment, the display arrangement 10 is situated on the right on the galley 11 or galley monument 1. It is likewise possible for the display arrangement 10 to be mounted on the left on the galley 11 or galley monument 1, for example. In general, the display 5 can be rotated or pivoted into an optimum alignment at any time, allowing the display 5 to be moved into the state of use at any time, rotated or tilted flexibly into a suitable orientation and stowed again on completion by the flight crew. FIG. 6 furthermore shows that the receiving region 7 does not necessarily have to be only a cubbyhole 2 or a special display receptacle. In principle, any (sufficiently large) free spatial zone of the galley 11 can be used to stow the display 5. In the case of FIG. 6, the display 5 can be folded away rearwards on the right-hand side of the galley 11, for example. In other embodiments, the display 5 could be attached horizontally, for example, on a front lower edge of a storage compartment or the like above a sideboard, thus allowing the display 5 to be folded away rearwards against the underside of the storage compartment with an upward pivoting movement.

In the preceding detailed description, various features have been combined in one or more examples in order to improve the cogency of the illustration. However, it should be clear that the above description is merely illustrative but in no way restrictive in nature. It serves to cover all the alternatives, modifications and equivalents of the various features and embodiment examples. Many other examples will be immediately and directly clear to a person skilled in the art based on their expert knowledge in view of the above description.

The embodiment examples have been chosen and described to enable the principles underlying the invention and their possible uses in practice to be illustrated as well as possible. This will enable those skilled in the art to modify and use the invention and its various embodiment examples in an optimum way in respect of the intended purpose. In the claims and the description, the terms "containing" and "having" are used as linguistically neutral concepts for the corresponding term "comprising". Furthermore, use of the terms "a" and "an" is not intended, in principle, to exclude a plurality of features and components described in this way.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS 1 galley monument
2 cubbyhole
3 galley component
4 catch
5 display
6 display holder
7 receiving region
8a inward-pivoting angle
8b outward-pivoting angle
9 angle of rotation
10 display arrangement
11 galley
12 display housing
13 outer edge
14 safety bracket
15 indicator unit
16 pivoting axis/tilting axis
17, 17' axis of rotation
100 aircraft

The invention claimed is:

1. A galley monument having an integrated display arrangement, comprising:
    a display;
    a display holder, by which the display is movably attached to the galley monument such that the display is configured to pivot about a first axis, wherein the display holder is configured as a rotary-pivot joint;
    a first receiving region, into which the display is configured to be pivoted into a stowed state by the display holder along the first axis, the first receiving region arranged at a first position relative to the axis;
    a second receiving region, into which the display is configured to be pivoted into at least one use state by the display holder, the second receiving region arranged at a second position relative to the first axis, the first axis extending along an edge of the galley monument; and
    the edge of the galley monument arranged between the first receiving region and the second receiving region,
    wherein the display holder is mounted to the edge of the galley monument,
    wherein the display is configured to be rotated by the display holder in the at least one state of use to set an orientation for use by first pivoting about the first axis into a second position relative to the axis in the state of use, and
    wherein, to assume one of the at least one state of use in the second receiving region, the display is further configured to rotate about a second axis passing through the display holder and perpendicular to the first axis.

2. The galley monument according to claim 1, wherein the display holder is configured in such a way that the display is configure to be pivoted about the first axis into the first receiving region as far as a predetermined inward-pivoting angle relative to the galley monument.

3. The galley monument according to claim 2, wherein the predetermined inward-pivoting angle is 90°.

4. The galley monument according to claim 1, wherein the display is configured to be pivoted out from the galley monument by the display holder in the at least one state of use.

5. The galley monument according to claim 4, wherein the display holder is configured in such a way that the display is configured to be pivoted out as far as a predetermined outward-pivoting angle relative to the galley monument.

6. The galley monument according to claim 1, wherein the display holder is configured in such a way that the display is configured to be rotated by 360° around the display holder about the second axis in one of the at least one state of use.

7. The galley monument according to claim 1, further comprising a display housing, into which the display holder is integrated.

8. The galley monument according to claim 7, wherein the display housing is formed integrally together with the display holder.

9. The galley monument according to claim 1, wherein the edge comprises a horizontal and/or vertical outer edge of the galley monument.

10. The galley monument according to claim 1, wherein at least one of the first receiving region or the second receiving region is a cubbyhole and/or a display receptacle.

11. The galley monument according to claim 1, wherein safety brackets are mounted on the display.

12. The galley monument according to claim 11, wherein the safety brackets are configured as gripping brackets for manual movement of the display.

13. The galley monument according to claim 1, wherein power lines and/or data lines for supplying the display extend within the display holder between the galley monument and the display.

14. An aircraft or spacecraft having a galley and comprising at least one galley monument according to claim 1.

15. The galley monument according to claim 1, wherein the rotary-pivot joint is configured to rotate about an axis perpendicular to the galley monument.

16. The galley monument according to claim 1, wherein the display is configured to rotate by any angle between 0° and 360°.

\* \* \* \* \*